United States Patent
Piorkowski et al.

(10) Patent No.: US 10,054,167 B2
(45) Date of Patent: Aug. 21, 2018

(54) DRIVESHAFT WITH TWO-STAGE STIFFNESS

(71) Applicant: GM GLOBAL TECHNOLOGY OPERATIONS LLC, Detroit, MI (US)

(72) Inventors: Paul A. Piorkowski, Milford, MI (US); Michael J. Grimmer, Troy, MI (US); Mark Gehringer, Milford, MI (US); Stephanie A. Erntser, Novi, MI (US); Eric J Defenderfer, Brighton, MI (US); Stephen H. Miller, South Lyon, MI (US)

(73) Assignee: GM Global Technology Operations LLC, Detroit, MN (US)

( * ) Notice: Subject to any disclaimer, the term of this patent is extended or adjusted under 35 U.S.C. 154(b) by 148 days.

(21) Appl. No.: 15/136,003

(22) Filed: Apr. 22, 2016

(65) Prior Publication Data

US 2016/0238083 A1    Aug. 18, 2016

Related U.S. Application Data (63) Continuation-in-part of application No. 14/503,531, filed on Oct. 1, 2014, now Pat. No. 9,416,815.

(51) Int. Cl.
*F16D 3/12*    (2006.01)
*F16C 3/02*    (2006.01)
(Continued)

(52) U.S. Cl.
CPC .................. *F16D 3/12* (2013.01); *F16C 1/02* (2013.01); *F16C 3/023* (2013.01); *F16D 1/0858* (2013.01);
(Continued)

(58) Field of Classification Search
CPC .... F16C 1/02; F16C 3/023; F16D 3/12; F16D 7/025; F16D 47/02; F16D 1/0858;
(Continued)

(56) References Cited

U.S. PATENT DOCUMENTS 2,590,169 A    3/1952    Fritz
2,734,359 A    2/1956    Mulheim et al.
(Continued)

FOREIGN PATENT DOCUMENTS

CN    103210226 A    7/2013
DE    2715076 A1    10/1978

*Primary Examiner* — Greg Binda
(74) *Attorney, Agent, or Firm* — Quinn IP Law (57) ABSTRACT

A two-stage stiffness driveshaft includes a hollow cylinder having first and second ends and a hollow cylinder stiffness. An inner shaft having first and second ends and an inner shaft stiffness extends through the hollow cylinder. The inner shaft's first end and the hollow cylinder's first end are engaged via a rotational clearance fit. The inner shaft's second end is rotationally fixed to the hollow cylinder's second end to permit the inner shaft's first end to twist through a predetermined angle relative to the inner shaft's second end. The inner shaft's stiffness defines the driveshaft's first-stage stiffness, while the combined stiffness of the inner shaft and the hollow cylinder defines the driveshaft's second-stage stiffness. A damping element positioned between the inner shaft and the hollow cylinder controls variation in torque transmitted by the driveshaft and generates gradual transition between the first-stage stiffness and the second-stage stiffness.

16 Claims, 4 Drawing Sheets

(51) Int. Cl.
| | |
|---|---|
| *F16D 1/08* | (2006.01) |
| *F16D 3/10* | (2006.01) |
| *F16D 3/72* | (2006.01) |
| *F16D 7/02* | (2006.01) |
| *F16C 1/02* | (2006.01) |
| *F16D 47/02* | (2006.01) |
| *F16F 1/00* | (2006.01) |
| *F16D 1/10* | (2006.01) |

(52) U.S. Cl.
CPC ................. *F16D 3/10* (2013.01); *F16D 3/72* (2013.01); *F16D 7/025* (2013.01); *F16D 47/02* (2013.01); *F16F 1/00* (2013.01); *F16D 2001/102* (2013.01); *F16D 2300/10* (2013.01)

(58) Field of Classification Search
CPC ........ F16D 3/72; F16D 3/10; F16D 2001/102; F16D 2300/10; F16F 1/00
USPC .......................................................... 464/97
See application file for complete search history.

(56) References Cited

U.S. PATENT DOCUMENTS

| | | |
|---|---|---|
| 4,127,080 A | 11/1978 | Lakiza et al. |
| 5,672,111 A | 9/1997 | Schremmer et al. |
| 9,770,947 B1 * | 9/2017 | Piorkowski ............. B60B 35/14 |
| 2011/0209961 A1 | 9/2011 | Yamamoto et al. |

* cited by examiner

DRIVESHAFT WITH TWO-STAGE STIFFNESS

CROSS-REFERENCE TO RELATED APPLICATION(S)

This application is a Continuation in Part of the U.S. Utility Application Ser. No. 14/503,531, filed Oct. 1, 2014, now U.S. Pat. No. 9,416,815 B2, the disclosure of which is hereby incorporated by reference in its entirety.

TECHNICAL FIELD

The disclosure relates to a driveshaft with two-stage stiffness for transmitting torque.

BACKGROUND

A driveshaft, such as a propeller shaft or Cardan shaft, or an axle shaft, is a mechanical component used for transmitting rotation and torque from a powerplant. Driveshafts are typically used to connect components of a drive-train that cannot be connected directly because of distance or the need to allow for relative movement between them.

In motor vehicles, driveshafts typically transmit torque from the engine to the vehicle's driven wheels. Loads on a vehicle driveshaft are mainly the result of engine output torque overlaid with the engine's torsional vibrations, and the vehicle's inertia. Driveshafts are generally constructed to withstand operating stresses, while limiting additional weight and inertia. Vehicle driveshafts frequently incorporate one or more mechanical joints designed to permit variation in alignment and/or distance between the driving and driven components.

SUMMARY

A two-stage stiffness driveshaft for transmitting an input torque includes a hollow cylinder defined by a longitudinal axis, a first end, and a distal second end, and having a hollow cylinder stiffness. The two-stage stiffness driveshaft also includes an inner shaft extending through the hollow cylinder along the longitudinal axis and defined by a first end, and a distal second end, and having an inner shaft stiffness. The driveshaft additionally includes a first damping element arranged between the inner shaft and the hollow cylinder and configured to control variation in the input torque transmitted by the driveshaft. The first end of the inner shaft is engaged with the first end of the hollow cylinder via a rotational clearance fit. The second end of the inner shaft is rotationally fixed to the second end of the hollow cylinder such that the first end of the shaft can twist up to a predetermined angle with respect to the second end of the inner shaft. The inner shaft stiffness defines a first-stage stiffness of the driveshaft, and the inner shaft stiffness and the hollow cylinder stiffness together define a second-stage stiffness of the driveshaft. The first damping element is configured to generate a gradual, i.e., smooth, transition between the first-stage stiffness and the second-stage stiffness.

The first end of the inner shaft may include a first outer spline and the first end of the hollow cylinder may include a first inner spline. The first outer spline may be engaged with the first inner spline via the rotational clearance fit at a first interface.

The two-stage stiffness driveshaft may also include a second damping element arranged between the first outer spline and the first inner spline. The second damping element may be an elastomer component occupying and filling the rotational clearance fit to thereby control variation in the input torque transmitted by the driveshaft at the first interface.

The second end of the inner shaft may include a second outer spline and the second end of the hollow cylinder may include a second inner spline. The second outer spline may be press-fit into the second inner spline at a second interface.

The first damping element may be an elastomer component having an internal elastic hysteresis.

The elastomer component may be bonded to each of the inner shaft and the hollow cylinder.

The first damping element may be a friction component preloaded to generate a friction force between the inner shaft and the hollow cylinder.

The friction component may be one or more friction washers.

The inner shaft may include an inner shaft flange arranged inside the hollow cylinder perpendicular to the longitudinal axis, while the hollow cylinder may include a cylinder surface arranged perpendicular to the longitudinal axis. In such a case, the friction component may be arranged inside the hollow cylinder and be preloaded between the inner shaft flange and the hollow cylinder surface via an elastic element.

The second end of the inner shaft may be welded to the second end of the hollow cylinder.

A motor vehicle drivetrain employing such a two-stage stiffness driveshaft is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
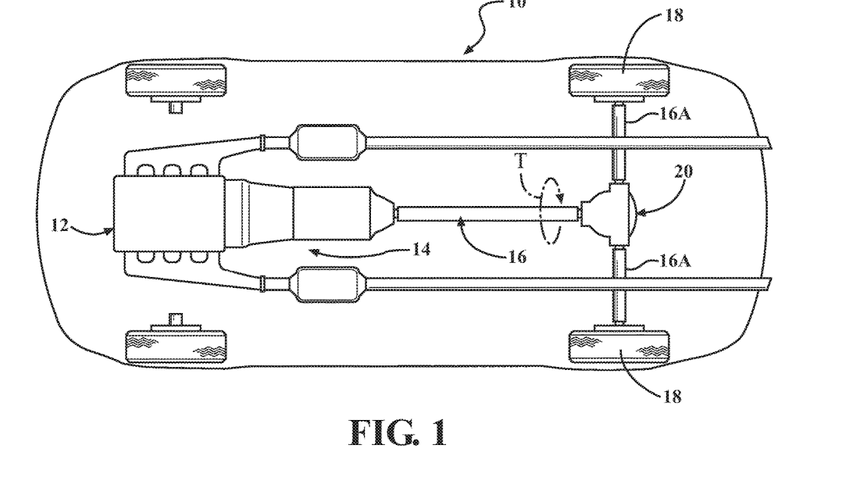
FIG. 1 is a schematic illustration of a motor vehicle drive-train including a two-stage stiffness driveshaft.

Referring to the drawings, wherein like reference numbers refer to like components, FIG. 1 shows a schematic view of a motor vehicle 10 which includes a drive-train adapted for propelling the vehicle. The drive-train includes an internal combustion engine 12, a transmission 14, and includes a two-stage stiffness driveshaft 16 for transmitting engine torque T from the transmission to one or more driven wheels 18 via a differential 20. Although the following disclosure primarily describes the two-stage stiffness driveshaft 16 as a propeller shaft extending longitudinally between the transmission 14 and the differential 20, the two-stage stiffness driveshaft 16 may also be employed as an axle shaft that extends between the differential 20 and the driven wheel 18 and denoted by numeral 16A. Furthermore, while the disclosure concentrates on a vehicle application of the two-stage stiffness driveshaft 16, the two-stage stiffness driveshaft may also be employed in other machinery and industrial applications.

Figure 2:
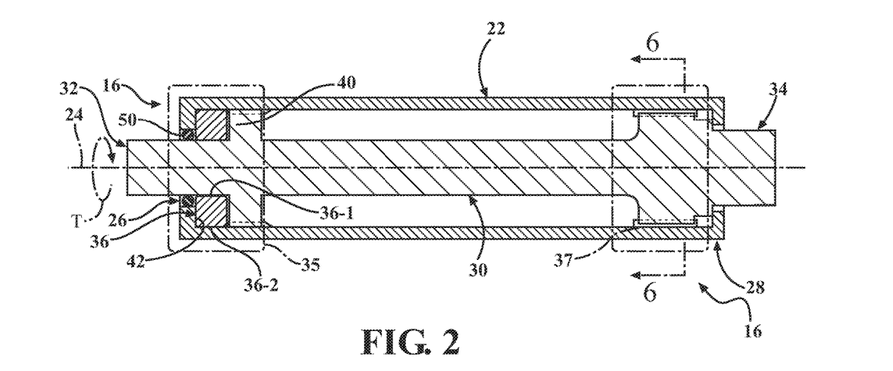
FIG. 2 is a schematic close-up cross-sectional illustration of an embodiment of the two-stage stiffness driveshaft depicted in FIG. 1, the driveshaft having an inner shaft extending through and engaging a hollow cylinder at first and second interfaces.
Figure 3:
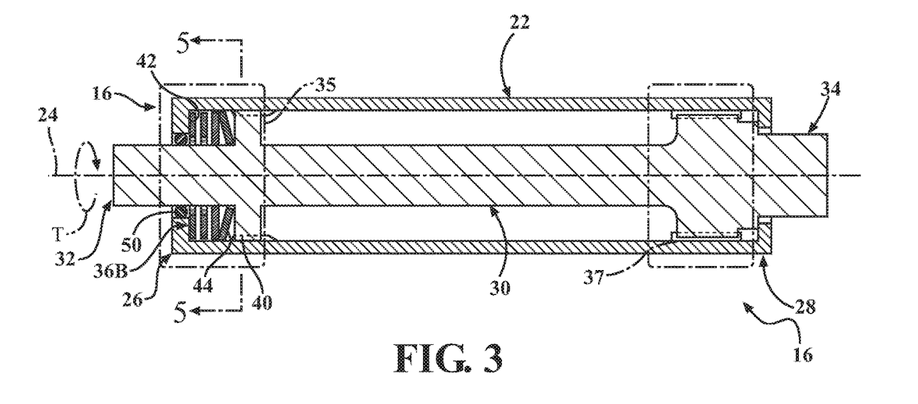
FIG. 3 is a schematic close-up cross-sectional illustration of another embodiment of the two-stage stiffness driveshaft depicted in FIG. 1, the driveshaft having an inner shaft extending through and engaging a hollow cylinder at first and second interfaces.
Figure 7:
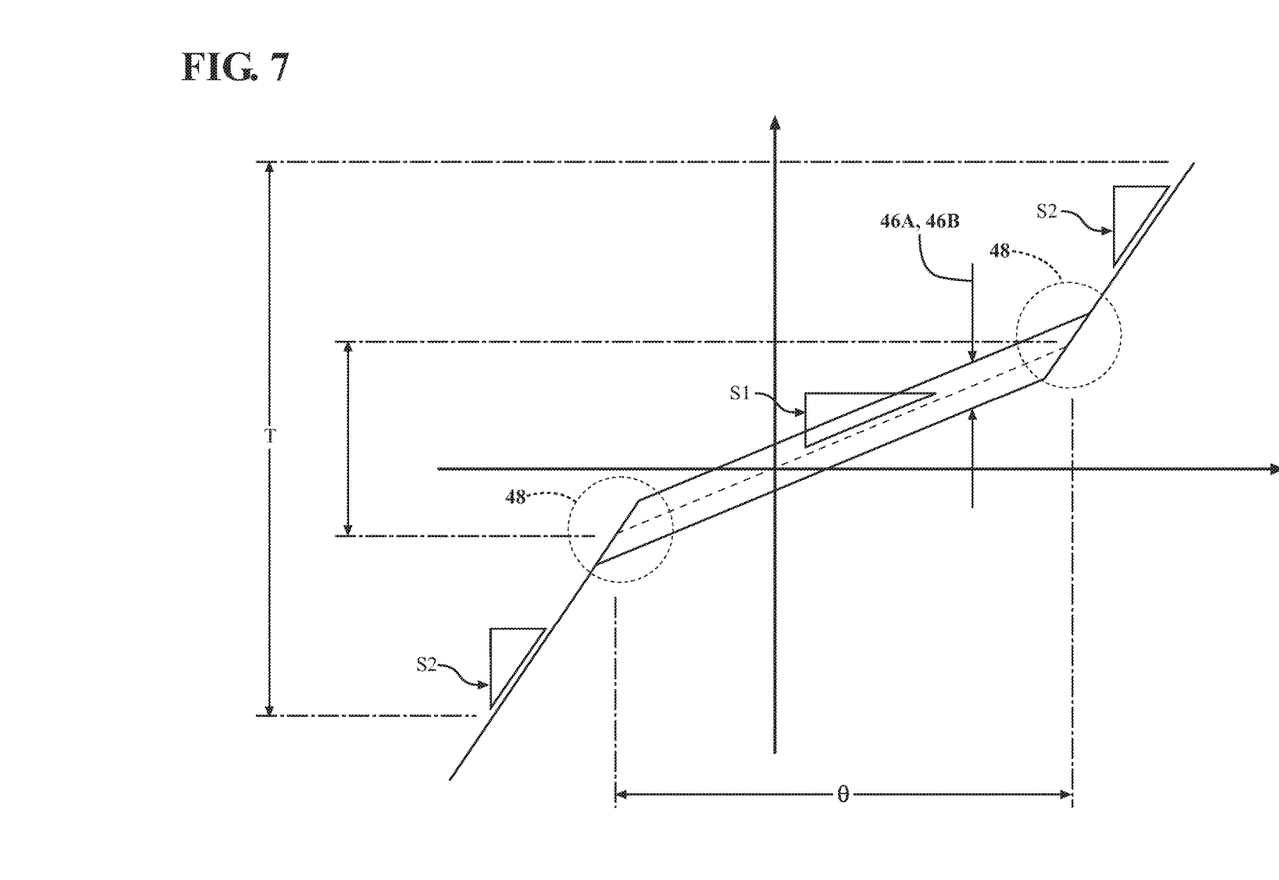
FIG. 7 is a graph of an angle of twist versus input torque for the two-stage stiffness driveshaft depicted in FIGS. 1-6.

As shown in FIGS. 2 and 3, the driveshaft 16 is configured to control, i.e., absorb, filter, and/or attenuate, variations in engine torque T, and includes a hollow cylinder 22. The hollow cylinder 22 is defined by a longitudinal axis 24, a first end 26, and a distal second end 28. The hollow cylinder 22 also has a hollow cylinder stiffness. The driveshaft 16 also includes an inner shaft 30 extending through the hollow cylinder 22 along the longitudinal axis 24. The inner shaft 30 is defined by a first end 32 and a distal second end 34, and has an inner shaft stiffness. Additionally, the inner shaft 30 may have an optional hollow construction. The first end 32 of the inner shaft 30 is engaged with the first end 26 of the hollow cylinder 22 via a rotational clearance fit 33 (shown in FIG. 4) at a first interface 35. The stiffness of the inner shaft 30 defines a first-stage stiffness or spring factor 51 of the driveshaft 16, as shown in FIG. 7. Additionally, the combined stiffness of the inner shaft 30 and of the hollow cylinder 22 defines a second-stage stiffness or spring factor S2 of the driveshaft 16, as also shown in FIG. 7.

The second end 34 of the inner shaft 30 is rotationally fixed to the second end 28 of the hollow cylinder 22. The fixed connection of the inner shaft 30 to the hollow cylinder 22 at the respective second ends 34, 28 facilitate twisting of the inner shaft 30, i.e., angular displacement of the first end 32 with respect to the second end 34 in response to received input engine torque T of sufficient magnitude. The maximum twist of the inner shaft 30 is defined by the rotational clearance fit 33 between the first ends 32 and 26 of the respective inner shaft 30 and hollow cylinder 22, and is limited to a predetermined angle θ (shown in FIG. 7). Each of the hollow cylinder 22 and the inner shaft 30 may be constructed from a high strength formable material, such as aluminum or steel, and be reinforced for additional stiffness with a material such as carbon fiber. Accordingly, the second-stage stiffness S2 of the driveshaft 16 is attained after the inner shaft 30 experiences maximum twist that is defined by the rotational clearance fit 33.

Figure 4:
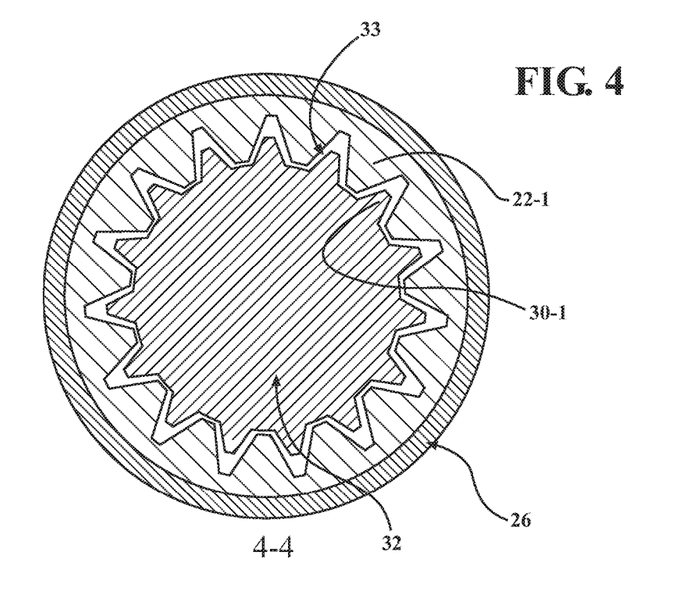
FIG. 4 is a schematic close-up illustration of an embodiment of a section through the first interface depicted in FIGS. 2 and 3.
Figure 5:
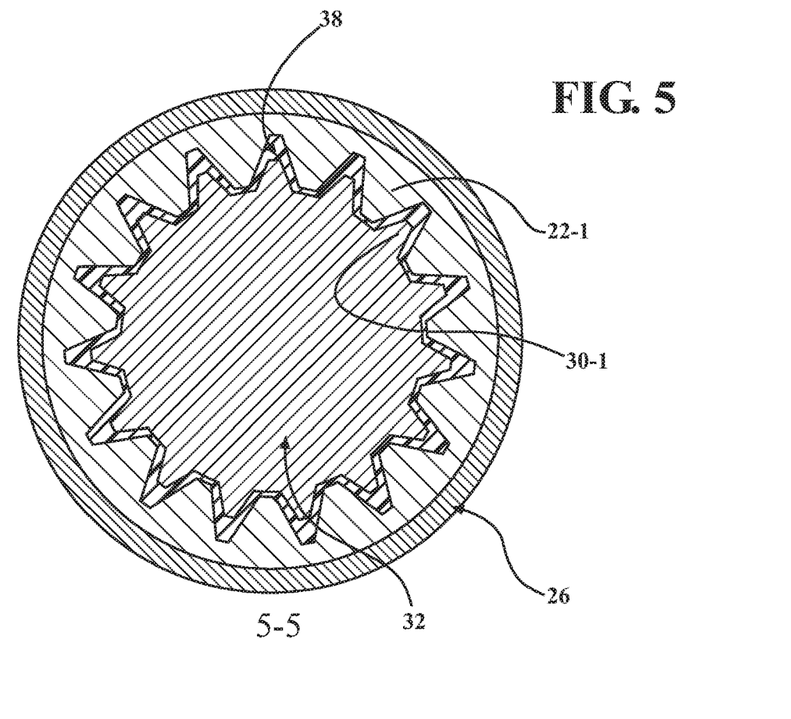
FIG. 5 is a schematic close-up illustration of another embodiment of a section through the first interface depicted in FIGS. 2 and 3.

As shown in section 4-4 illustrated in FIG. 4 and section 5-5 illustrated in FIG. 5, the first end 32 of the inner shaft 30 may include a first outer spline 30-1 and the first end 26 of the hollow cylinder 22 may include a first inner spline 22-1. As shown in FIG. 4, the first outer spline 30-1 of the inner shaft 30 and the first inner spline 22-1 of the hollow cylinder 22 are engaged such that a predetermined amount of lash or clearance is established therebetween. Accordingly, the rotational clearance fit 33 at the respective first ends 32 and 26 may be established via the lash in the engagement between the first outer spline 30-1 and the first inner spline 22-1, such that the maximum twist of the inner shaft 30 is limited to the predetermined angle θ. A specific portion of the rotational clearance fit 33 may be established between adjacent faces of the first outer spline 30-1 and the first inner spline 22-1 on each of the drive torque, i.e., torque T in positive direction, and coast torque, i.e., torque T in negative direction, sides of the spline engagement. Such specific portions of the rotational clearance fit 33 allocated between the drive and coast sides of the engagement of splines 30-1, 22-1 may be established via numerical computations and/or empirical analysis, while the predetermined angle θ may be indicative of the entire clearance fit 33, as may be seen in FIG. 7.

A first damping element 36 is arranged between the inner shaft 30 and the hollow cylinder 22. The first damping element 36 is configured to control variation in the input torque T transmitted by the driveshaft 16 via generated damping. Additionally, the first damping element 36 is configured to generate a gradual shift from the first-stage stiffness S1 to the second-stage stiffness S2, in other words, smooth out a transition 48 between the first-stage and the second-stage stiffness, which will be discussed in detail below. As shown in FIG. 2, the first damping element 36 may be configured as an elastomer component, for example shaped or molded from a specifically formulated rubber compound having an internal elastic hysteresis 46A. The elastic hysteresis 46A of the elastomer first damping element 36 is the energy dissipated due to the subject material's internal friction, and is generally shown as an area in the center of a force versus extension plot in FIG. 7. Accordingly, the elastomer first damping element 36 can achieve dual function of springing and damping because the subject material's pronounced hysteresis does not return all the absorbed compression energy on the rebound. Additionally, elastic hysteresis may be dependent on rate of loading, for example, elastic hysteresis may be more pronounced in elastomers when the loading and unloading is done quickly than when it is done slowly. Therefore, the hysteresis 46A shown in FIG. 7 can be generated solely by the elastomer first damping element 36.

As shown, the elastomer first damping element 36 has an inner diameter 36-1 and an outer diameter 36-2. In order to achieve and maintain a preset connection between the hollow cylinder 22, the elastomer first damping element 36, and the inner shaft 30, the first damping element may be bonded to the inner shaft at the inner diameter 36-1 and to the hollow cylinder at the outer diameter 36-2. The inner shaft 30 may include an inner shaft flange 40 arranged inside, i.e., internal to, the hollow cylinder 22, proximate the first end 32 of the inner shaft and perpendicular to the longitudinal axis 24. The hollow cylinder 22 may include a cylinder end wall or surface 42 arranged proximate the first end 26 of the hollow cylinder and perpendicular to the longitudinal axis 24. Alternatively, the elastomer first damping element 36 may be bonded to the inner shaft at the inner shaft flange 40 and to the hollow cylinder at the cylinder end wall 42. In a separate embodiment shown in FIG. 3, the first damping element may be configured as a friction component designated by numeral 36B. The friction component first damping element 36B may be preloaded to generate a friction force between the inner shaft 30 and the hollow cylinder 22, and thus provide appropriate friction hysteresis 46B (shown in FIG. 7) and damping to control oscillations between the inner shaft and the hollow cylinder.

As shown in FIG. 2, the elastomer first damping element 36 has an inner diameter 36-1 and an outer diameter 36-2. In order to achieve and maintain a preset connection between the hollow cylinder 22, the elastomer first damping element 36, and the inner shaft 30, the first damping element may be bonded to the inner shaft at the inner diameter 36-1 and to the hollow cylinder at the outer diameter 36-2. The inner shaft 30 may include an inner shaft flange 40 arranged inside, i.e., internal to, the hollow cylinder 22, proximate the first end 32 of the inner shaft and perpendicular to the longitudinal axis 24. The hollow cylinder 22 may include a cylinder end wall or surface 42 arranged proximate the first end 26 of the hollow cylinder and perpendicular to the longitudinal axis 24. Alternatively, the elastomer first damping element 36 may be bonded to the inner shaft 30 at the inner shaft flange 40 and to the hollow cylinder 22 at the cylinder end wall 42. The elastomer first damping element 36 may be arranged inside the hollow cylinder 22, such that the first damping element is substantially enclosed by the driveshaft 16 and thereby shielded from external contamination and debris.

As shown in FIG. 3, the friction component first damping element 36B may also be arranged inside the hollow cylinder 22 and substantially enclosed by the driveshaft 16 for being shielded from external contamination and debris. The friction component first damping element 36B can be preloaded between the inner shaft flange 40 and the hollow cylinder surface 42 via an elastic element 44, such as a spring. As also shown, the friction component embodiment 36B of the first damping element may be configured as one or more friction washers arranged in series. Each of such friction washers may be configured from graphite or any other appropriate material that is capable of providing stable friction characteristics under a wide range of operating conditions in the vehicle 10. The friction hysteresis 46B shown in FIG. 7 can thus be the result of the friction component first damping element 36B preloaded via the elastic element 44.

Additionally, as shown in section 5-5 illustrated in FIG. 5, a second damping element 38 may be arranged between the first outer spline 30-1 and the first inner spline 22-1. The second damping element 38 may be configured to control variation in the input torque T transmitted by the driveshaft 16 at the first interface 35 via generated damping. The second damping element 38 may be an elastomer component, for example shaped or molded from a material similar to the elastomer embodiment of the first damping element 36. As shown in FIG. 5, the second damping element 38 may occupy the rotational clearance fit 33, and, furthermore, take up or substantially fill the entire rotational clearance fit. The damping provided by the first and/or second damping elements 36, 38 is intended to have the effect of controlling, such as reducing or restricting twisting oscillations of the inner shaft 30 with respect to the hollow cylinder 22 within the two-stage stiffness driveshaft 16. Such damping is generated by dissipation of the energy stored in the subject oscillations.

Figure 6:
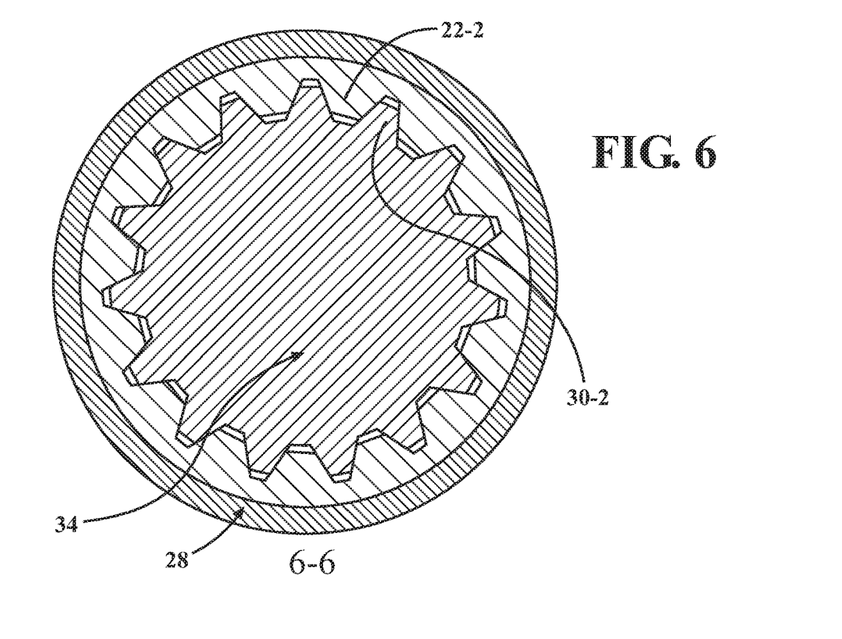
FIG. 6 is a schematic close-up illustration of a section through the second interface depicted in FIGS. 2 and 3.

As shown in section 6-6 illustrated in FIG. 6, the second end 34 of the inner shaft 30 may include a second outer spline 30-2 and the second end 28 of the hollow cylinder 22 may include a second inner spline 22-2. The second outer spline 30-2 may be press-fit into the second inner spline 22-2 at a second interface 37 to thereby establish the rotationally fixed connection of the second end 34 to the second end 28. Accordingly, the subject press-fit between the second outer spline 30-2 and the second inner spline 22-2 is employed to establish the allocation of specific portions of the rotational clearance fit 33 between the drive and coast sides of the engagement of splines 30-1, 22-1. An alternative construction of the second interface 37 may include the second end 34 of the inner shaft 30 being welded to the second end 28 of the hollow cylinder 22, whether or not employing the second inner and outer splines 22-2 and 30-2.

Accordingly, each of the elastomer and the friction component embodiments of the first damping element 36 may be employed for generating respective hysteresis, 46A or 46B, for consistent damping when the input torque engine T is being filtered by the first-stage stiffness S1 of the driveshaft 16 through the predetermined angle θ. Furthermore, the first-stage stiffness S1 and the friction damping are together configured to attenuate variation in the input engine torque T that is to be transmitted by the driveshaft 16, and thus reduce potential vibration in the drive-train of the vehicle 10. The first-stage stiffness S1, in combination with the attendant friction damping, is primarily intended to provide effective filtering of high-amplitude and low-frequency oscillations in engine torque T, such as may be encountered during vehicle cruising conditions.

On the other hand, the second-stage stiffness S2 is intended to provide reduced driveshaft compliance for vehicle acceleration under high engine torque T, such as at wide-open-throttle. Furthermore, a transition 48 between the first-stage stiffness S1 and second-stage stiffness S2, as shown in FIG. 7, is controlled by the damping provided by the respective hysteresis 46A or 46B provided via the first damping element 36 of either embodiments disclosed above. As discussed above, the hysteresis 46A, 46B is primarily intended to reduce oscillation amplitude when the driveshaft 16 is operated in the first-stage, i.e., at stiffness S1, which may take place during high amplitude transient maneuvers. Accordingly, the transition 48 between the first-stage stiffness S1 and the second-stage stiffness S2 is intended to facilitate control of transient torque oscillations that can take place as operation of the vehicle 10 shifts between drive and coast torque during various vehicle maneuvers. For example, such transient torque oscillations may be generated when the direction of torque transmitted by the driveshaft switches from the engine torque T driving the vehicle 10 to the vehicle inertia back-driving the drive-train and generating engine braking. Additionally, subject transient torque oscillations may result from increased torsional vibrations generated by an engine with some of its cylinders deactivated, for example if two cylinders in a four cylinder engine are deactivated for enhanced fuel efficiency.

As shown in each of FIGS. 2 and 3, the driveshaft 16 may additionally include a seal 50. The seal 50 may be arranged between the cylinder 22 and the inner shaft 30 proximate the first interface 35. Specifically, the seal 50 is configured to substantially enclose the first interface 35 and thereby limit access of road-borne debris to first and/or second damping elements 36, 38. The seal 50 may have an O-ring cross-section and be formed from a suitable compliant material, such as a polymeric compound, that is capable of providing reliable sealing under a wide range of operating conditions of the vehicle 10.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A two-stage stiffness driveshaft for transmitting an input torque, the two-stage stiffness driveshaft comprising:
a hollow cylinder defined by a longitudinal axis, a first end, and a distal second end, and having a hollow cylinder stiffness;
an inner shaft extending through the hollow cylinder along the longitudinal axis and defined by a first end, and a distal second end, and having an inner shaft stiffness; and
a first damping element arranged between the inner shaft and the hollow cylinder and configured to control variation in the input torque transmitted by the driveshaft;
wherein:
the first end of the inner shaft is engaged with the first end of the hollow cylinder via a rotational clearance fit;
the second end of the inner shaft is rotationally fixed to the second end of the hollow cylinder such that the first end of the inner shaft will twist to a predetermined angle with respect to the second end of the inner shaft in response to the input torque;
the inner shaft stiffness defines a first-stage stiffness of the driveshaft and the inner shaft stiffness together with the hollow cylinder stiffness defines a second-stage stiffness of the driveshaft; and
the first damping element is configured to generate a gradual transition between the first-stage stiffness and the second-stage stiffness;
wherein:
the first damping element includes one or more friction washers preloaded to generate a friction force between the inner shaft and the hollow cylinder.

2. The two-stage stiffness driveshaft of claim 1, wherein:
the first end of the inner shaft includes a first outer spline and the first end of the hollow cylinder includes a first inner spline; and
the first outer spline is engaged with the first inner spline via the rotational clearance fit at a first interface.

3. The two-stage stiffness driveshaft of claim 2, further comprising a second damping element arranged between the first outer spline and the first inner spline, wherein the second damping element is an elastomer component occupying the rotational clearance fit and configured to control variation in the input torque transmitted by the driveshaft at the first interface.

4. The two-stage stiffness driveshaft of claim 2, wherein:
the second end of the inner shaft includes a second outer spline and the second end of the hollow cylinder includes a second inner spline; and
the second outer spline is press-fit into the second inner spline at a second interface.

5. The two-stage stiffness driveshaft of claim 1, wherein the inner shaft includes an inner shaft flange arranged inside the hollow cylinder perpendicular to the longitudinal axis;
the hollow cylinder includes a cylinder surface arranged perpendicular to the longitudinal axis; and
the one or more friction washers are arranged inside the hollow cylinder and are preloaded between the inner shaft flange and the hollow cylinder surface via an elastic element.

6. The two-stage stiffness driveshaft of claim 1, wherein the second end of the inner shaft is welded to the second end of the hollow cylinder.

7. The two-stage stiffness driveshaft of claim 1, wherein each of the one or more friction washers is a one-piece annular element.

8. The two-stage stiffness driveshaft of claim 1, wherein the one or more friction washers is a plurality of friction washers arranged in series.

9. A drive-train for a motor vehicle comprising:
a power-plant configured to generate torque;
a road wheel; and
a two-stage stiffness driveshaft configured to transmit the torque from the power-plant to the road wheel, the driveshaft including:
a hollow cylinder defined by a longitudinal axis, a first end, and a distal second end, and having a hollow cylinder stiffness;
an inner shaft extending through the hollow cylinder along the longitudinal axis and defined by a first end, and a distal second end, and having an inner shaft stiffness; and
a first damping element arranged between the inner shaft and the hollow cylinder and configured to control variation in the torque transmitted by the driveshaft;
wherein:
the first end of the inner shaft is engaged with the first end of the hollow cylinder via a rotational clearance fit, and is configured to receive the torque from the power-plant;
the second end of the inner shaft is rotationally fixed to the second end of the hollow cylinder such that the first end of the inner shaft will twist to a predetermined angle with respect to the second end of the inner shaft in response to the torque received from the power-plant;
the inner shaft stiffness defines a first-stage stiffness of the driveshaft and the inner shaft stiffness together with the hollow cylinder stiffness defines a second-stage stiffness of the driveshaft; and
the first damping element is configured to generate a gradual transition between the first-stage stiffness and the second-stage stiffness;
wherein:
the first damping element includes one or more friction washers preloaded to generate a friction force between the inner shaft and the hollow cylinder.

10. The drive-train of claim 9, wherein:
the first end of the inner shaft includes a first outer spline and the first end of the hollow cylinder includes a first inner spline; and
the first outer spline is engaged with the first inner spline via the rotational clearance fit at a first interface.

11. The drive-train of claim 10, further comprising a second damping element arranged between the first outer spline and the first inner spline, wherein the second damping element is an elastomer component occupying the rotational clearance fit and configured to control variation in the torque received by the driveshaft from the power-plant at the first interface.

12. The drive-train of claim 10, wherein:
the second end of the inner shaft includes a second outer spline and the second end of the hollow cylinder includes a second inner spline; and
the second outer spline is press-fit into the second inner spline at a second interface.

13. The drive-train of claim 9, wherein the inner shaft includes an inner shaft flange arranged inside the hollow cylinder perpendicular to the longitudinal axis;
- the hollow cylinder includes a cylinder surface arranged perpendicular to the longitudinal axis; and
- the one or more friction washers are arranged inside the hollow cylinder and are preloaded between the inner shaft flange and the hollow cylinder surface via an elastic element.

14. The drive-train of claim 9, wherein the second end of the inner shaft is welded to the second end of the hollow cylinder.

15. The drive-train of claim 9, wherein each of the one or more friction washers is a one-piece annular element.

16. The drive-train of claim 9, wherein the one or more friction washers is a plurality of friction washers arranged in series.

\* \* \* \* \*